No. 860,664. PATENTED JULY 23, 1907.
L. P. HILL.
BICYCLE BOAT.
APPLICATION FILED APR. 5, 1906.
2 SHEETS—SHEET 1.
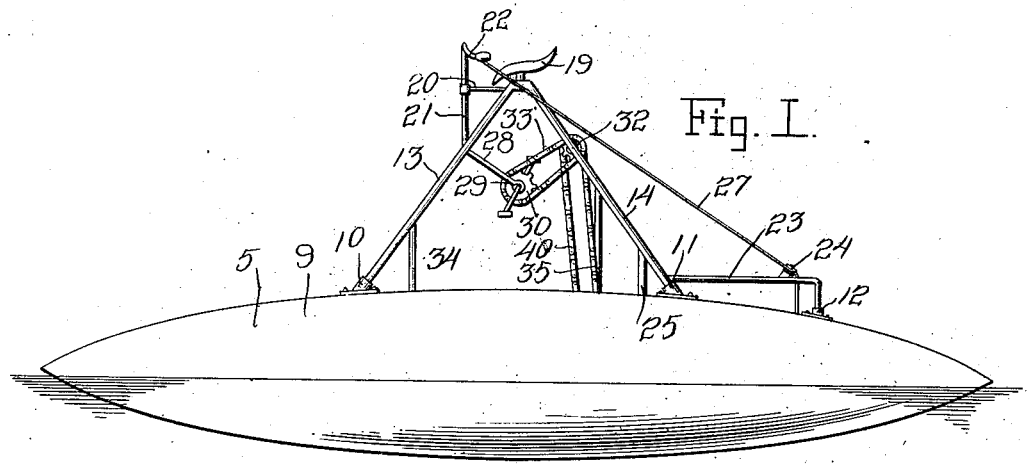
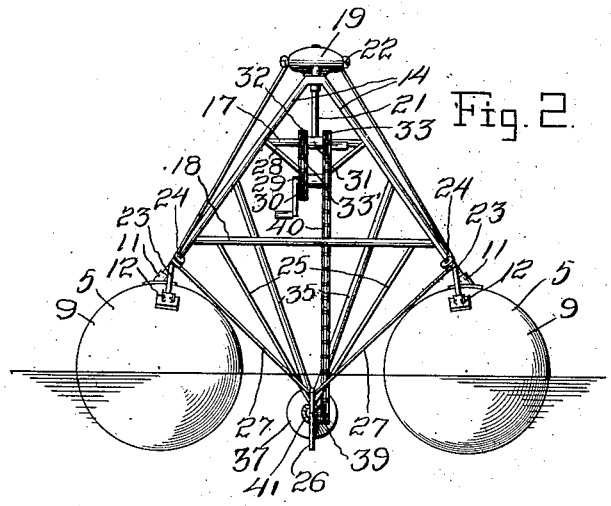

No. 860,664. PATENTED JULY 23, 1907.
L. P. HILL.
BICYCLE BOAT.
APPLICATION FILED APR. 5, 1906.
2 SHEETS—SHEET 2.
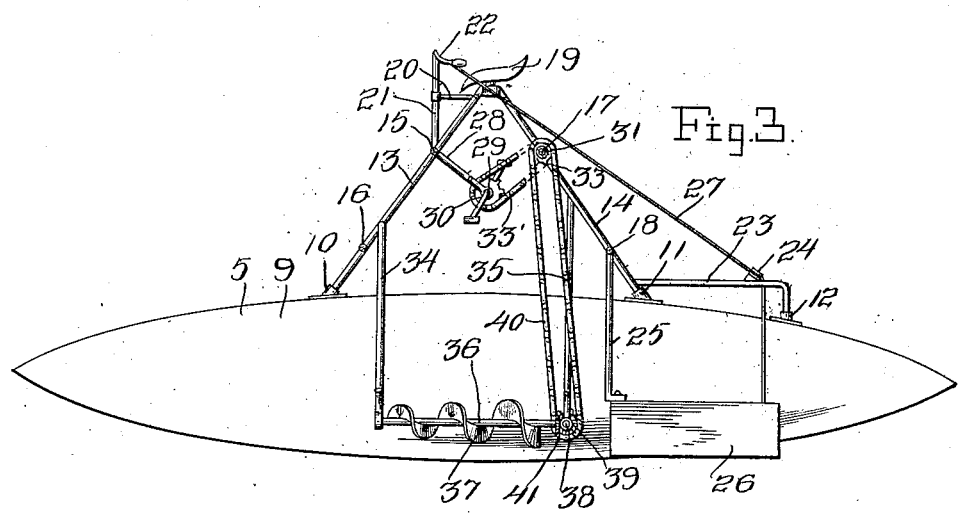
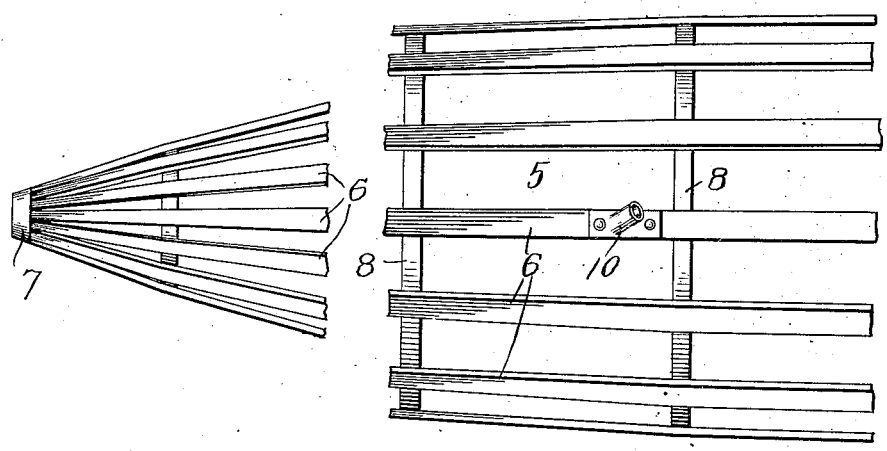

UNITED STATES PATENT OFFICE.

LAWRENCE P. HILL, OF CARATUNK, MAINE.

BICYCLE-BOAT.

No. 860,664.　　　Specification of Letters Patent.　　　Patented July 23, 1907.

Application filed April 5, 1906. Serial No. 310,102.

*To all whom it may concern:*

Be it known that I, LAWRENCE P. HILL, a citizen of the United States, residing at Caratunk, in the county of Somerset, State of Maine, have invented certain new and useful Improvements in Bicycle-Boats; and I do hereby declare the following to be a full, clear, and exact description of the invention, such as will enable others skilled in the art to which it appertains to make and use the same.

This invention relates to devices known as bicycle boats, which, as their name implies, are boats which are propelled manually in a manner similar to the propulsion of a bicycle.

The invention relates more specifically to that class of bicycle boats in which the propelling mechanism is mounted upon spaced floats and the primary object of the invention is to provide a novel form of propelling mechanism and a non-collapsible construction of float.

In the accompanying drawings:—Figure 1 is a side elevation of the invention. Fig. 2 is a rear view thereof. Fig. 3 is a vertical longitudinal sectional view through the same. Fig. 4 is a detail plan view of one of the floats, a portion of the cover being removed.

Referring to the drawings, the numeral 5 designates the floats of my bicycle boat, the said floats being tapered at each end and composed of a light metal skeleton frame including strips 6 which extend longitudinally of the floats and which are connected at their corresponding ends, as shown, at 7, and annular bracing strips 8 to which the strips 6 are secured. Each float also includes a covering 9 of rubber or other suitable material which is stretched over the framework of the float and inflated with air to render it buoyant. Secured to corresponding ones of the strips 6 of the floats adjacent the front and rear ends of the same are sockets 10, 11 and 12 and secured at their lower ends in the sockets 10 and 11 and converging upwardly therefrom are pairs of standards 13 and 14 respectively, the said standards of each pair being connected by means of upper and lower cross bars 15 and 16 and 17 and 18 respectively, which serve to brace their respective standards and hold the floats in spaced relation.

Mounted upon the connected upper ends of the standards 13 and 14 is a seat 19 and mounted to turn, in front of the said seat, in the cross bar 15 and a bracket 20 carried by the standards 13 is a steering shaft 21 having a handle bar 22 by means of which it may be turned. Secured at their rear ends in the sockets 12 and connected at their forward ends to the standards 14 are bars 23 and mounted upon the said bars are pulleys 24. Supported by means of a bracket 25 from the cross bar 18 is a rudder blade 26 and connected at one of their ends to opposite sides of the blade are cables 27, the said cables being engaged with the pulleys 24 and connected at their opposite ends to the handle bar 22 adjacent each end thereof. A bracket 28 is carried by the standards 13 and mounted in the bracket upon a crank shaft 29 is a sprocket gear 30, the said crank shaft 29 being provided with pedals whereby the same may be rotated as will be readily understood. Rotatably journaled upon the cross bar 17 is a sleeve 31 carrying sprocket gears 32 and 33 which are located adjacent each end of the sleeve 31 and engaged with the sprocket gears 30 and 32 is a sprocket chain 33, thus providing means for rotating the sleeve.

Mounted to rotate in suitable bearing brackets 34 and 35 is a propeller shaft 36 carrying a screw propeller 37 which is tapered from its front to its rear end as shown, and mounted upon a counter shaft 38 is a sprocket gear 39 with which and the gear 33 is engaged a chain 40, the said counter shaft and driven shaft being connected by means of bevel gears 41.

Having thus described the invention, what is claimed:—

A device of the class described comprising spaced floats, standards extending upwardly from the floats and connected at their upper ends, a seat supported upon the upper ends of the standards, a crank shaft journaled beneath the seat, a propeller shaft journaled beneath the crank shaft and between the floats and in parallel relation with respect thereto, gear connections between the crank shaft and the propeller shaft, rods connected with the floats and extending upwardly therefrom and thence forwardly and connected with the rear standards, pulleys journaled upon the rods a handle bar arranged in front of the seat for turning movement, a rudder mounted rearwardly of the propeller, cables connected with the ends of the handle bars and engaged around the pulleys and connected with the rudder.

In testimony whereof, I affix my signature, in presence of two witnesses.

LAWRENCE P. HILL.

Witnesses:
ABEL M. BUSWELL,
MALON PATTERSON.